(12) United States Patent
Nishiura et al.

(10) Patent No.: US 8,146,257 B2
(45) Date of Patent: Apr. 3, 2012

(54) BRUSH CUTTER

(75) Inventors: Yuka Nishiura, Kawagoe (JP); Kazuo Shirakami, Kawagoe (JP); Jun Noguchi, Kawagoe (JP)

(73) Assignee: Husqvarna Zenoah Co., Ltd., Kawagoe-Shi (JP)

( * ) Notice: Subject to any disclaimer, the term of this patent is extended or adjusted under 35 U.S.C. 154(b) by 369 days.

(21) Appl. No.: 12/445,995

(22) PCT Filed: Oct. 19, 2006

(86) PCT No.: PCT/JP2006/320838
§ 371 (c)(1),
(2), (4) Date: Apr. 17, 2009

(87) PCT Pub. No.: WO2008/047434
PCT Pub. Date: Apr. 24, 2008

(65) Prior Publication Data
US 2010/0293795 A1 Nov. 25, 2010

(51) Int. Cl.
*A01D 34/68* (2006.01)
(52) U.S. Cl. .......................... 30/276; 56/12.7
(58) Field of Classification Search .............. 30/276; 56/12.7; 173/162.1
See application file for complete search history.

(56) References Cited

U.S. PATENT DOCUMENTS

| 5,855,069 A * | 1/1999 | Matsubayashi et al. ......... 30/276 |
| 6,550,145 B2 * | 4/2003 | Stoll et al. ....................... 30/276 |
| 2005/0006114 A1 * | 1/2005 | Racov et al. ................. 173/162.1 |

FOREIGN PATENT DOCUMENTS

| JP | 60-185424 U | 12/1985 |
| JP | 1-121318 U | 8/1989 |
| JP | 02-131821 U | 1/1990 |
| JP | 4-52414 U | 5/1992 |
| JP | 06-054617 A | 1/1994 |
| JP | 6-21296 Y2 | 6/1994 |
| JP | 9-256863 A | 9/1997 |
| JP | 11-275925 A | 10/1999 |
| JP | 2002-034314 A | 2/2002 |
| JP | 3348139 B2 | 9/2002 |
| JP | 2005168339 * | 6/2005 |
| JP | 2006-042697 A | 2/2006 |

OTHER PUBLICATIONS

Japanese Office Action dated Apr. 20, 2010 and English translation thereof in counterpart Japanese Application No. 2005-255478.
International Preliminary Report on Patentability and Written Opinion of the International Searching Authority dated Jun. 3, 2009 (5 pages), issued in counterpart International application No. PCT/JP2006/320838.

* cited by examiner

*Primary Examiner* — Stephen Choi
(74) *Attorney, Agent, or Firm* — Holtz, Holtz, Goodman & Chick, PC

(57) ABSTRACT

A brush cutter is provided with fixing pieces projecting outward and opposing each other substantially at a middle position of a slit stretching between both ends of a clamp member. Accordingly, an outer pipe is clamped in the middle of an attachment housing and apart from an axial center of the outer pipe, so that a size of the attachment housing in an axial direction can be reduced and stress concentration on the outer pipe can be avoided.

3 Claims, 4 Drawing Sheets

BRUSH CUTTER

This application is a U.S. National Phase Application under 35 USC 371 of International Application PCT/JP2006/320838 filed Oct. 19, 2006.

TECHNICAL FIELD

The present invention relates to a brush cutter for cutting grass, and branches and leaves of trees.

BACKGROUND ART

A known brush cutter drives a cutting blade by a rotating driving force of a power section (see, for example, Patent Document 1).

A brush cutter disclosed in Patent Document 1 includes: a power section provided with an engine; a gear case provided with a cutting blade; and an outer pipe provided with a transmitting shaft therein, where the power section and the gear case are connected to each other by the outer pipe and an engine power is transmitted through the transmitting shaft to the cutting blade to rotate the cutting blade. A cover that receives the outer pipe is provided anteriorly to the power section of the brush cutter, in which an engagement piece for fixing the inserted outer pipe is provided in a projecting manner at the front end (the side of the cutting blade) of the cover, and vibration isolator is provided between the hack side (the engine side) of the cover and the inserted outer pipe.

[Patent Document 1] JP-UM-A-60-185424 (see pages 3-6 and FIGS. 1 and 2)

DISCLOSURE OF THE INVENTION

Problems to be Solved by the Invention

According to a typical arrangement like Patent Document 1, the engagement piece projecting at the front end of the cover tightens the outer pipe, so that the outer pipe is fixed. Accordingly, a stress concentrates at a connecting portion of the engagement piece and the outer pipe, so that the outer pipe is likely to be broken or cut.

An object of the present invention is to provide a brush cutter that prevents an outer pipe from being disengaged, broken or cut.

Means for Solving the Problems

A brush cutter according to an aspect of the invention includes: an outer pipe that is provided with a cutting blade attachment at one end and is provided with a power section at the other end; and a housing that connects the outer pipe and the power section, in which the housing includes: a housing main body fixed to the power section; and a clamp member received in the housing main body while the outer pipe is inserted therein, the housing main body being provided in a manner to tighten a portion of the clamp member received in the housing main body.

According to the above aspect of the invention, the housing main body tightens a portion of a clamp member received in the housing main body, e.g. a substantially middle position in an axial direction of the clamp member to hold the outer pipe. Accordingly, a stress acting on the outer pipe is dispersed, which prevents the outer pipe from being broken or cut due to the stress.

In the brush cutter according to the above aspect of the invention, it is preferable that the clamp member is entirely received in the housing main body.

According to the above arrangement of the invention, since the clamp member is entirely provided in the housing main body, the clamp member does not project forward from the housing main body, so that the length of the housing can be shortened in an axial direction. Accordingly, an attachment position of a grip and the like provided anteriorly to the housing can be disposed adjacent to the power section by the shortened length, so that an effect of the weight of the power section can be reduced, thereby improving the operability of the brush cutter.

BEST MODE FOR CARRYING OUT THE INVENTION

An exemplary embodiment of the invention will be described below with reference to the drawings.

Figure 1:
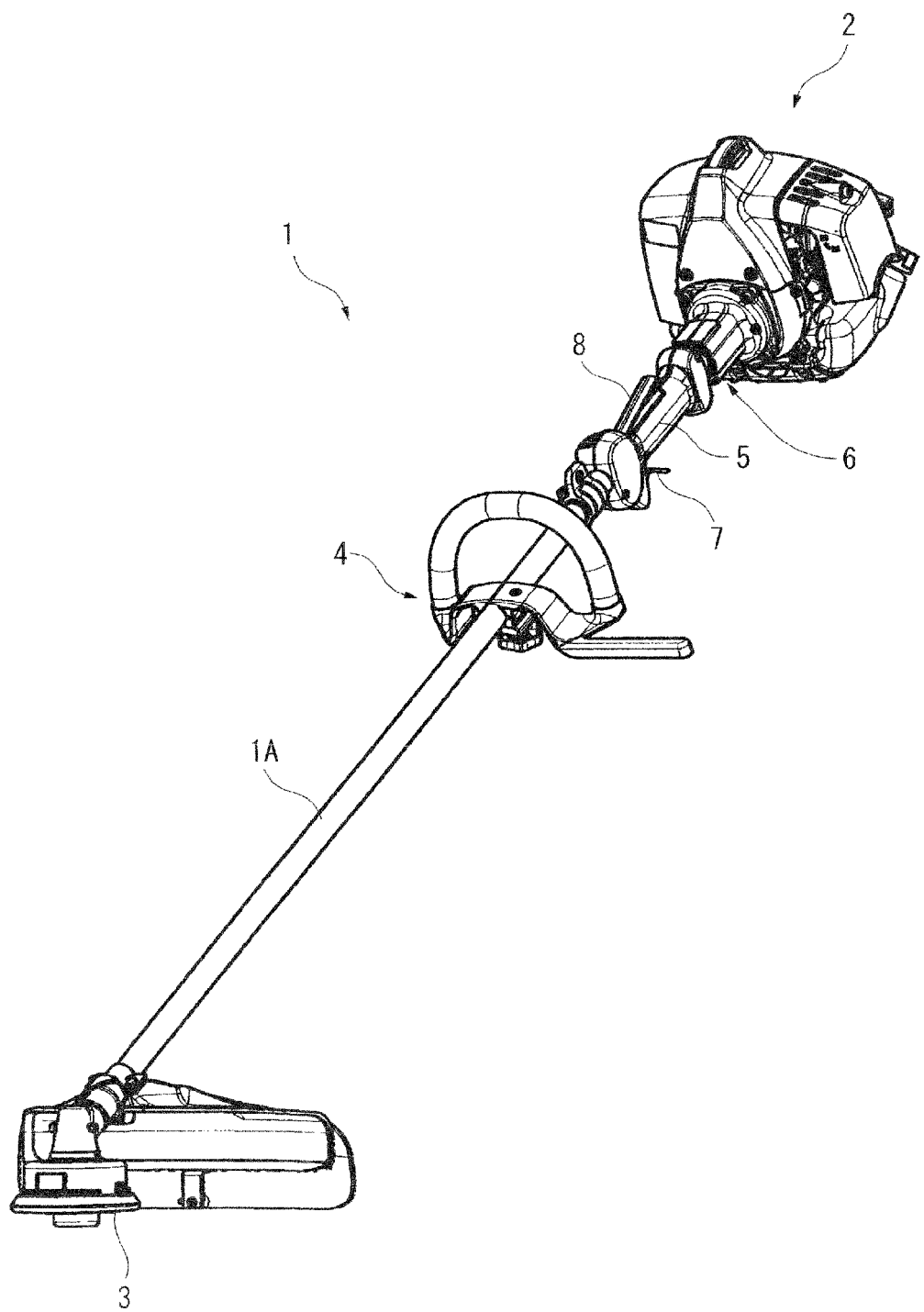
FIG. 1 is an entire perspective view of a brush cutter of an exemplary embodiment of the invention.
Figure 2:
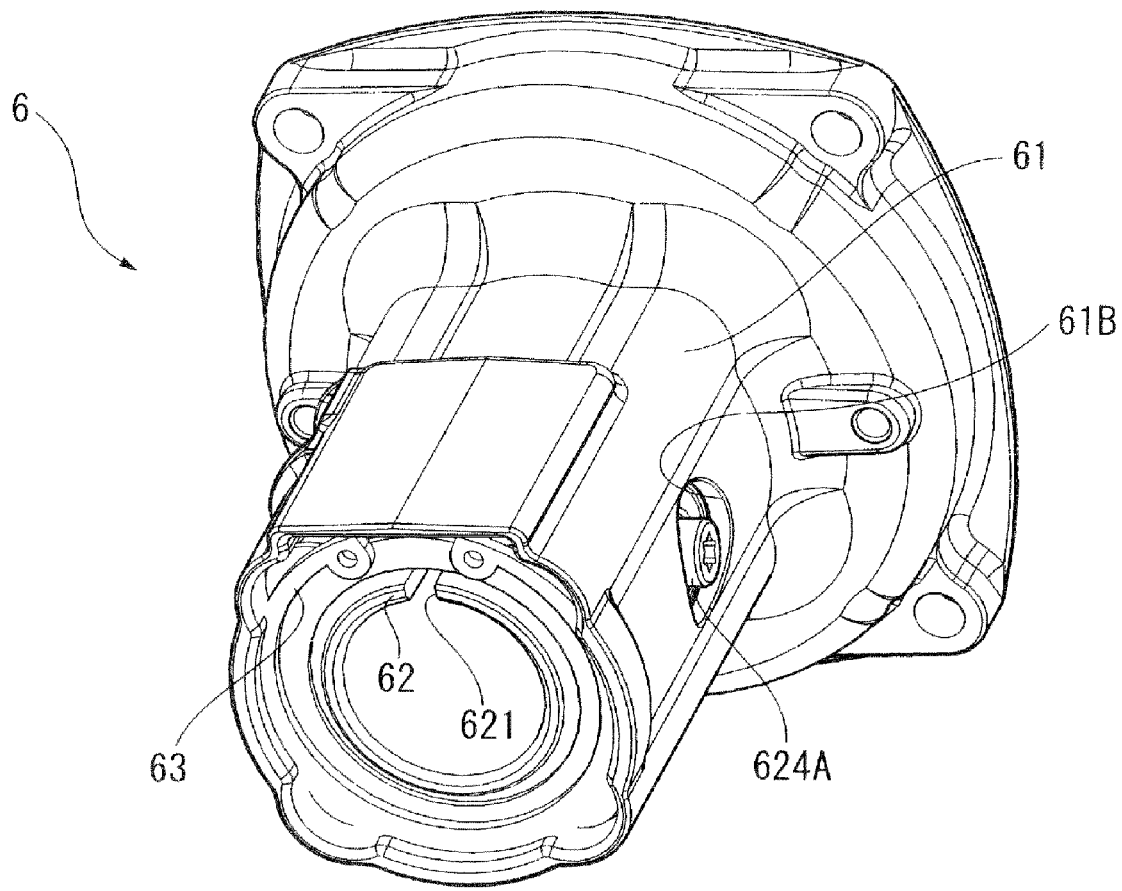
FIG. 2 is a perspective view of an attachment housing of the above exemplary embodiment.
Figure 3:
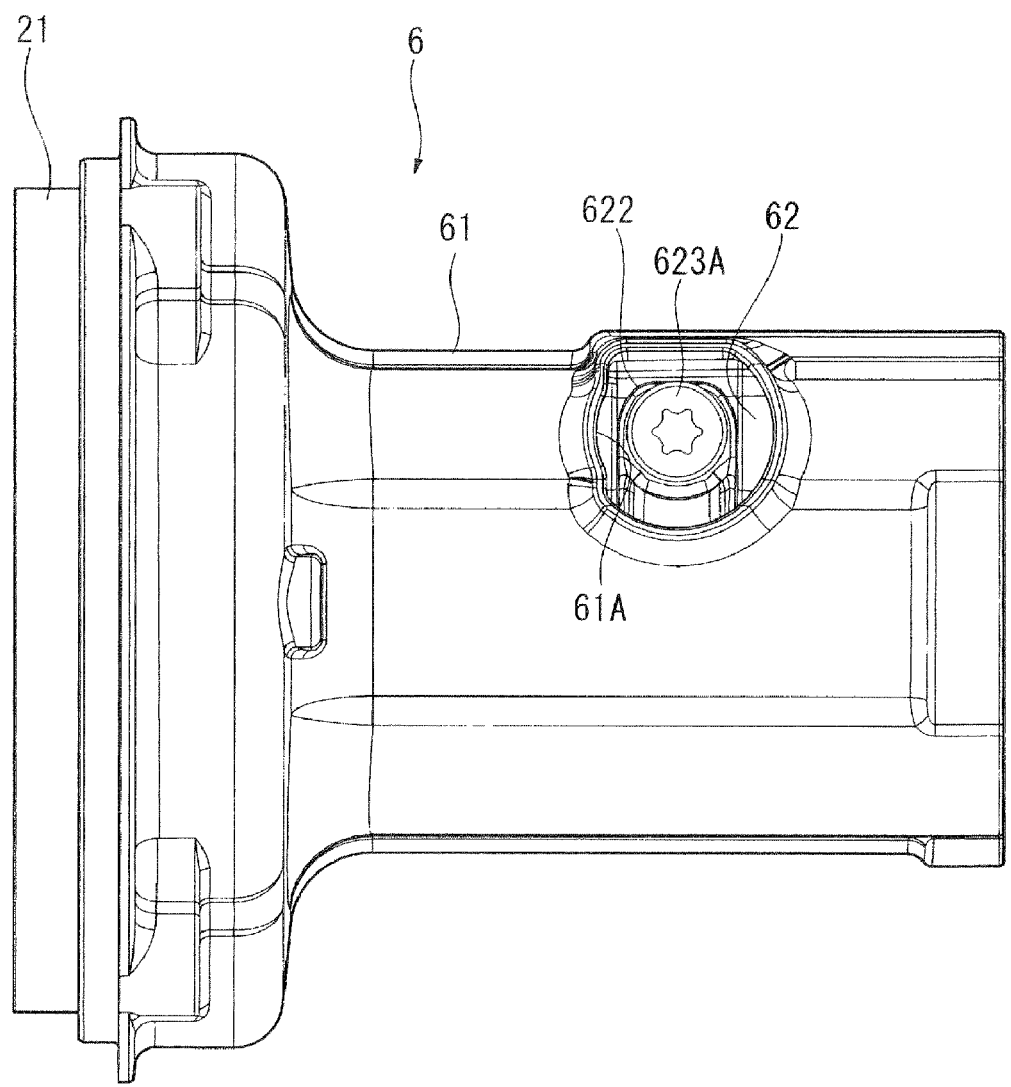
FIG. 3 is a side view of the attachment housing of the above exemplary embodiment.
Figure 4:
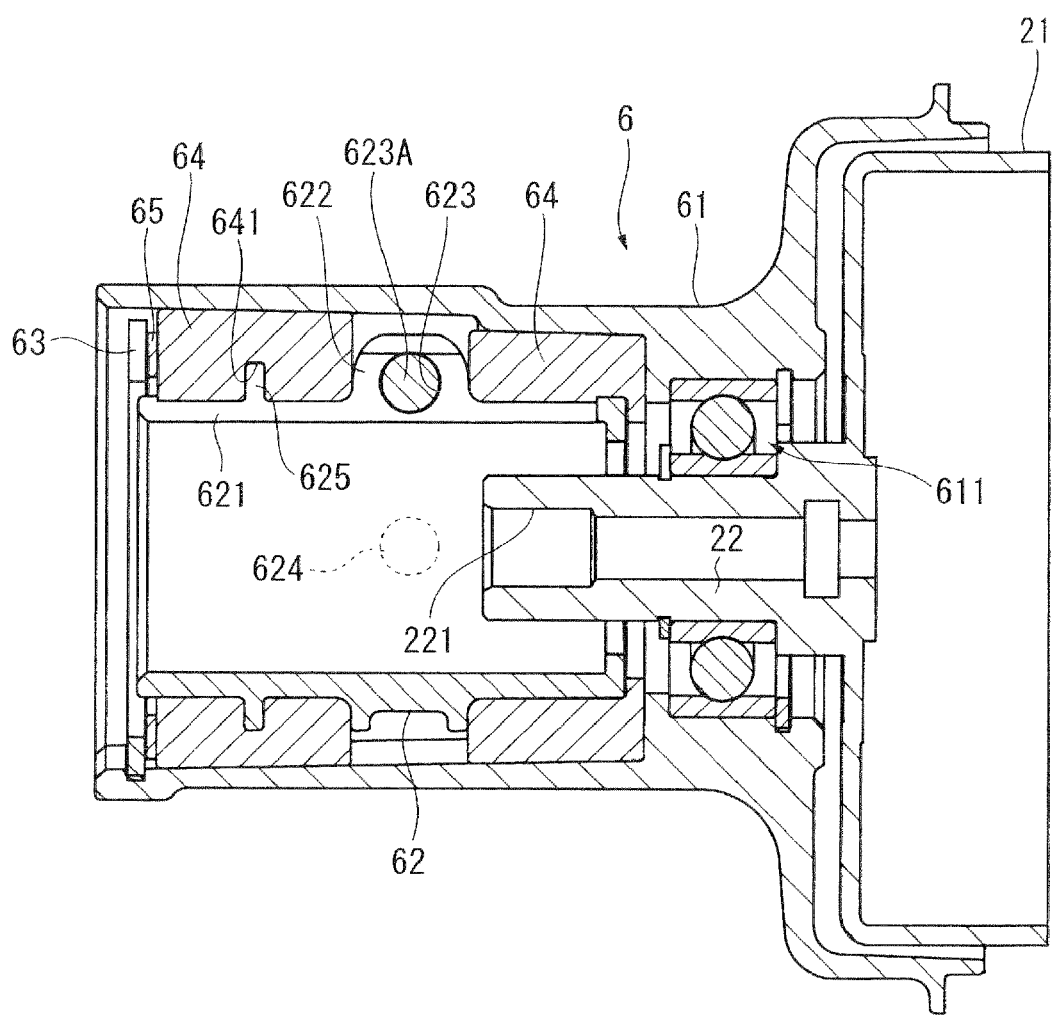
FIG. 4 is a cross section of the attachment housing of the above exemplary embodiment.

FIG. 1 is a perspective view showing an entire brush cutter according to an exemplary embodiment. FIG. 2 is a perspective view of the attachment housing of the above exemplary embodiment. FIG. 3 is a side view of the attachment housing of the above exemplary embodiment. FIG. 4 is an axial cross section of the attachment housing of the above exemplary embodiment.

In FIG. 1, a brush cutter 1 includes a power section 2 at one end of an outer pipe 1A and a cutting blade attachment 3 at the other end. A shaft for transmitting a power from the power section 2 is inserted in the outer pipe 1A. By this shaft, a rotating force from the power section 2 is transmitted to the cutting blade attachment 3. A cutting blade and a nylon cutter (now shown) can be attached to the cutting blade attachment 3. These cutting blades cut grass, and branches and leaves of trees when being rotated. Moreover, a loop handle 4 and a grip 5 held by an operator are disposed on the outer pipe 1A.

The power section 2 provided at the other end of the outer pipe 1A includes an engine covered with a plurality of covers (not shown). An attachment housing 6 for the outer pipe 1A to be connected is fixed to the power section 2. A driving shaft of the engine is connected to a centrifugal clutch. A structure of the attachment housing 6 will be described below.

The centrifugal clutch is rotated by a driving force of the engine, so that the rotary driving force is transmitted to a clutch drum 21 when the centrifugal clutch is rotated at a predetermined speed or more. The clutch drum 21 includes a drive transmitting shaft 22 received at a bearing 611 in the attachment housing 6, the drive transmitting shaft 22 being provided with a shaft hole 221 along a center axis of the drive transmitting shaft. The shaft is fitted and fixed in the shaft hole 221, in which the driving force of the engine is transmitted to the shaft through the centrifugal clutch, thereby rotating the shaft.

The grip 5 is attached on the outer pipe 1A adjacent to the attachment housing 6. The grip 5 is disposed at a position held by an operator in operating the brush cutter 1. The weight of the power section 2 can be supported by holding the grip 5. An accelerator lever 7 for output operation of the power section 2 while holding a safety lever 8 is disposed in the proximity of the grip 5.

[Structure of Attachment Housing]

Next, the attachment housing 6 for attaching the outer pipe 1A to the power section 2 will be described in detail.

In FIGS. 2 to 4, the attachment housing 6 fixed at the power section 2 includes: a substantially cylindrical housing main body 61; and a clamp member 62 disposed on the inner circumference of the housing main body 61.

The housing main body 61 is fixed by being bolted to, for instance, a crankcase constituting the engine of the power section 2. In an opening of the housing main body 61 on the side of the power section 2, the aforementioned clutch drum 21 is received. The aforementioned bearing 611 receiving the drive transmitting shaft 22 of the clutch drum 21 is disposed in the housing main body 61 to rotatably hold the drive transmitting shaft 22. In an opening of the housing main body 61 on the side of the grip 5, a snap ring 63 is fitted along the inner circumference of the housing main body 61.

Further, on a side surface of the housing main body 61, a pair of communicating holes 61A and 61B that communicate the inside with the outside are respectively provided at different positions.

The clamp member 62 is formed to be substantially cylindrical. A part of the circumference of the clamp member 62 is provided with a linear slit 621 stretching between the both ends of the cylinder. A pair of fixing pieces 622 opposing each other across the slit 621 are disposed substantially at the center of the slit 621. The fixing pieces 622 is provided with a bolt tightening hole 623 provided at a position corresponding to the communicating hole 61A of the housing main body 61. A bolt 623A is inserted through the communicating hole 61A into the bolt tightening hole 623 while the outer pipe 1A is inserted in the cylinder of the clamp member 62, so that opposing fixing pieces 622 are tightened to hold the outer pipe 1A.

The bolt tightening hole 624 is also provided at a position corresponding to the other communicating hole 61B of the housing main body 61 on the circumference of the clamp member 62. The outer pipe 1A is provided with a screw hole (not shown) at a position opposing the communicating hole 61B and the bolt tightening hole 624. A bolt 624A is inserted through the communicating hole 61B into the bolt tightening hole 624 to be screwed into the screw hole, so that the outer pipe 1A is positioned so as not to be disengaged from the clamp member 62.

Further, between the clamp member 62 and the housing main body 61, annular vibration isolators 64 are provided across the fixing pieces 622 at each side of the power section 2 and the grip 5, the vibration isolators 64 being firmly attached to the clamp member 62 and the housing main body 61. Each of the vibration isolators 64 is formed of an elastic member such as synthetic rubber, which prevents the vibration of the clamp member 62 and holds the clamp member 62 in the housing main body 61. The widths of the vibration isolators 64 provided on the side of the power section 2 and on the side of the grip 5 relative to the fixing pieces 622 are approximately the same. On outer circumference of the clamp member 62, a radially projecting positioning protrusion 625 is circumferentially formed. The vibration isolator 64 is provided with an annular fitting portion 641 engaging with the positioning protrusion 625. The vibration isolator 64 is positioned relative to the clamp member 62 by the positioning protrusion 625 and the fitting portion 641.

A metal backup ring 65 is provided adjacent to the snap ring 63 fixed to the housing main body 61 on the side of the grip 5 of the vibration isolator 64. Due to the backup ring 65, the vibration isolator 64 and, consequently, the clamp member 62 are firmly pressed by the snap ring 63, which reliably prevents the clamp member 62 from being disengaged from the housing main body 61.

Advantage of Embodiment(s)

As described above, the fixing pieces 622 opposing each other substantially at the center of the slit 621 stretching between both ends of the clamp member 62 are provided in the brush cutter of the above exemplary embodiment. The housing main body 61 tightens the clamp member 62 at the positions corresponding to the fixing pieces 622. Accordingly, the operator can tighten the clamp member 62 substantially at the middle position of the clamp member 62 in the axial direction from the outside of the housing main body 61, thereby clamping the outer pipe 1A. Consequently, a stress acting on the outer pipe 1A can be dispersed by tightening the fixing pieces 622 disposed in such positions, thereby preventing the outer pipe 1A from being broken and cut due to excessive concentration of stress.

Additionally, the clamp member 62 is received in the housing main body 61, where an end of the clamp member 62 does not project out of an end of the housing main body 61. Accordingly, a size of the attachment housing 6 in an axial direction can be reduced. Consequently, since the grip 5 can be made closer to the power section 2 by the reduced size of the attachment housing 6 in the axial direction, an effect of the weight of the power section 2 can be reduced by holding the grip 5. Therefore, the brush cutter can be operated in a well-balanced manner to improve the operability thereof.

Further, since a pair of the vibration isolators 64 are juxtaposed along an axial direction, the vibration isolators 64 can be firmly attached to the clamp member 62 and the housing main body 61 in a large area, vibration isolation characteristics of the clamp member can be further improved, and the clamp member 62 can be reliably held in the housing main body 61 by friction of the clamp member 62 against the inner circumference of the housing main body 61.

Modification of Embodiment(s)

Incidentally, it should be understood that the scope of the present invention is not limited to the above-described exemplary embodiment(s) but includes modifications described below as long as an object of the present invention can be achieved.

For example, in the above exemplary embodiment, the fixing pieces 622 are respectively disposed in bisected positions of the vibration isolator 64, but such an arrangement of the fixing pieces 622 is not limitative. The fixing pieces 622 may be disposed at a position more adjacent to the power section 2 or the grip 5 as long as stress concentration does not easily occur.

The vibration isolators 64 are disposed on respective sides of the power section 2 and the grip 5. However, the vibration isolators 64 may be connected to be integrated at a portion except for the position where the fixing pieces 622 of the clamp member 62 are provided. According to the above arrangement, vibration isolation characteristics can be further improved.

Though the screw hole is formed on the outer pipe 1A opposing the bolt tightening hole 624 of the clamp member 62, the screw hole may not be formed on the outer pipe 1A.

For example, the outer pipe 1A may be positioned by inserting a bolt through a clamp-side positioning hole and pressing the outer pipe 1A.

Though a pair of the fixing pieces 622 are formed substantially at the middle position of the clamp member 62, a plurality of the pair of the fixing pieces 622 may be formed. For example, two pairs of the fixing pieces 622 may be provided along the slit 621, thereby more reliably fixing the outer pipe 1A.

Further, the specific arrangements and configurations of the exemplary embodiment of the invention may be altered in any manner as long as an object of the invention can be achieved.

The invention claimed is:

1. A brush cutter, comprising:
    an outer pipe provided with a cutting blade attachment at a first end and a power section at a second end; and
    a housing that connects the outer pipe and the power section,
    wherein the housing comprises:
        a housing main body fixed to the power section; and
        a clamp member formed as a cylinder having a same axial direction as an axial direction of the outer pipe,
    wherein the clamp member is received in the housing main body while the outer pipe is inserted in the clamp member,
    wherein the housing main body is provided such that a portion of the clamp member received in the housing main body is tightenable, and
    wherein the clamp member comprises:
        a linear slit stretching between both ends of the cylinder; and
        a pair of fixing pieces provided substantially at a center of the slit in the axial direction of the clamp member and opposing each other across the slit,
    wherein a tightening stress is dispersed from a center of the clamp member in the axial direction thereof to ends of the clamp member when the outer pipe is clamped in the clamp member by tightening the pair of fixing pieces in a direction toward each other.

2. The brush cutter according to claim 1, wherein the clamp member is entirely received in the housing main body.

3. The brush cutter according to claim 1, further comprising annular vibration isolators provided across the fixing pieces at each side of the clamp member in the axial direction between the clamp member and the housing main body.

* * * * *